May 17, 1938.  K. C. D. HICKMAN  2,117,802
DISTILLATION PROCESS
Filed April 18, 1936    3 Sheets-Sheet 1

INVENTOR.
Kenneth C. D. Hickman
BY
ATTORNEYS

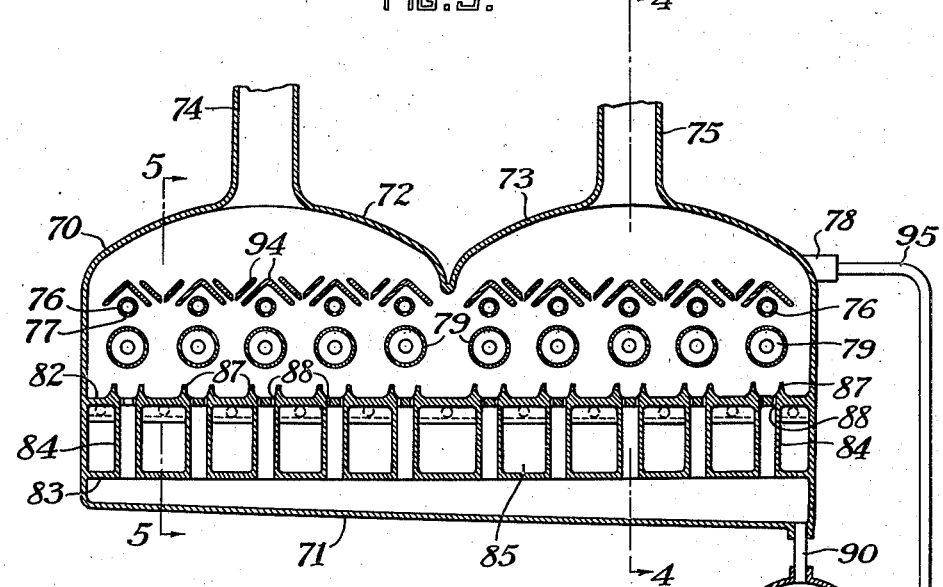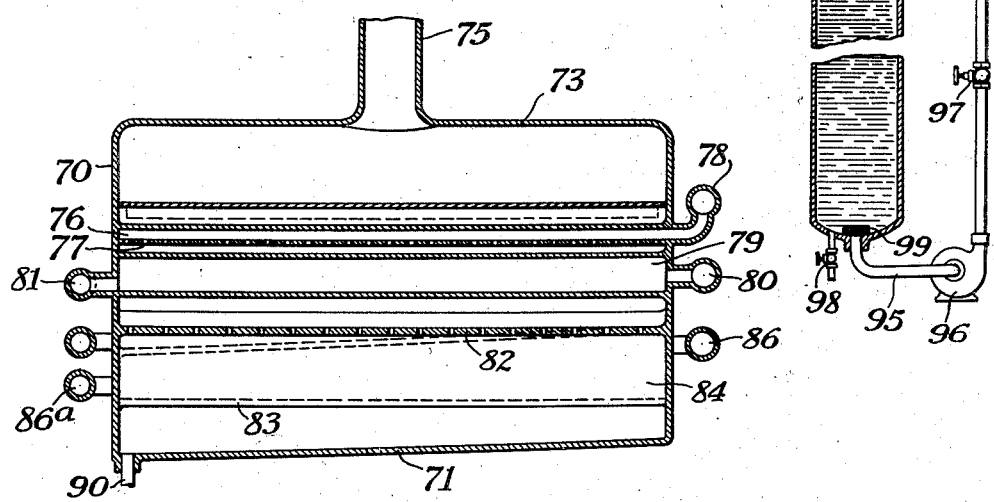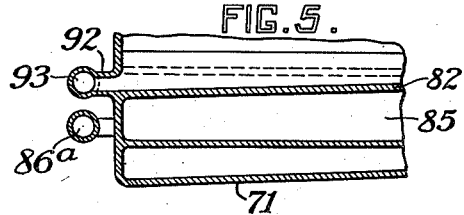

INVENTOR.
Kenneth C.D. Hickman

Patented May 17, 1938

2,117,802

UNITED STATES PATENT OFFICE 2,117,802

DISTILLATION PROCESS

Kenneth C. D. Hickman, Rochester, N. Y., assignor, by mesne assignments, to Eastman Kodak Company, Jersey City, N. J., a corporation of New Jersey Application April 18, 1936, Serial No. 75,163

8 Claims. (Cl. 202—52)

This invention relates to improvements in processes of high vacuum distillation particularly molecular distillation and apparatus therefor.

In ordinary high vacuum distillation apparatus known as a pot still has generally been employed. In such processes material to be distilled was introduced into the pot of the still and the entire body of material heated to distillation temperature and maintained at that temperature until a fraction or number of fractions had been withdrawn. Since materials usually distilled under high vacuum are of high molecular weight and complex in nature they are often thermally unstable and decompose on heating especially if prolonged. The conventional high vacuum stills have therefore resulted in decided decomposition due to the necessarily protracted heating and inefficient vaporization.

With the advent of molecular distillation the rate of vaporization was increased and undesired reactions avoided to a considerable extent. While a batch type of molecular still was used at first it was found that an increased rate of distillation, with resultant decrease in heating period and decomposition, could be obtained by flowing the distilland in a thin film over a heated evaporating column. In order to remove one fraction completely or to remove several fractions it was necessary to employ a number of heating columns in series, heated to appropriate temperatures and circulate the distilland over each successive column. Such procedure has necessitated vast expenditures in order to build and maintain such complicated apparatus. It has furthermore been almost impossible to regulate carefully the temperature and pressure conditions in each unit in such a manner that only the desired fractions would be removed and that overheating or underheating would not result. Dismantling and cleaning of many such units involves considerable loss in time and use of the apparatus. Since the rate of flow in each successive column was necessarily the same it was not possible to adjust the flow to an optimum value for each particular fraction being removed.

This invention has for its object to overcome the above deficiencies of high vacuum distillation processes. Another object is to provide a simple and economical process of molecular distillation whereby any desired number of fractions can be removed without circulation of distilland over a number of successive heating columns or through a number of successive stills. A further object is to provide a process of fractional molecular distillation which requires considerably less apparatus such as pumps, condensing and evaporating elements, etc. than has heretofore been used. A still further object is to provide a high vacuum distillation process which enables careful control of distillation conditions in a simple manner and avoidance of substantial decomposition. Another object is to provide improved high vacuum distillation apparatus. Other objects will appear hereinafter.

These objects are accomplished by the herein described invention which in its preferred embodiment comprises recycling material to be distilled over the heated evaporating element. After all of a single fraction has been removed the temperature may be elevated and a higher boiling fraction or fractions removed in the same manner. It is desirable to employ a reservoir of distilland and to withdraw material therefrom and circulate it over the evaporating surface and return undistilled material to the reservoir.

In the following examples and description I have set forth several of the preferred embodiments of my invention. However, it is to be understood that they are included for the purpose of illustration and not in limitation thereof.

I have discovered that a single high vacuum still may be employed to perform the functions of a multistage still if, instead of circulating distilland over a number of successive columns the distilland from a single column is collected and continuously recycled over the evaporating element of said single still. In practicing my invention it is advantageous to establish a reservoir of material to be distilled and to withdraw portions therefrom and circulate them over a heated column of a high vacuum still. Undistilled material is returned to the reservoir, the contents of which are continuously recirculated until all of a desired fraction has been removed. In order to remove several fractions the temperature is successively raised to appropriate values and the recycling continued until each fraction has been distilled off. When material containing heat sensitive compounds is to be distilled it is advantageous to cool undistilled material immediately after it is removed from the evaporating surface. In this manner distilland is heated only during the period that it is undergoing distillation and decomposition due to prolonged heating is thus avoided. It will be seen that by my invention the advantage and simplicity of the pot still is retained, yet only a fraction of the distilland in the apparatus is held at distillation temperature at any moment. This simplicity of the pot still is combined with the advantages of a long multi-column continuous still without entailing the disadvantages of this bulky and expensive piece of apparatus.

In order to carry out my invention, I have devised an improved type of high vacuum still various modifications of which are illustrated in the accompanying drawings in which;

Fig. 3 is a vertical section of multi-unit still illustrating the arrangement of a plurality of vaporizing surfaces having a common condensing surface.

Fig. 4 is a section taken on line 4—4 of Fig. 3.

Fig. 5 is a fragmentary section taken on line 5—5 of Fig. 3.

Figures 1, 2:
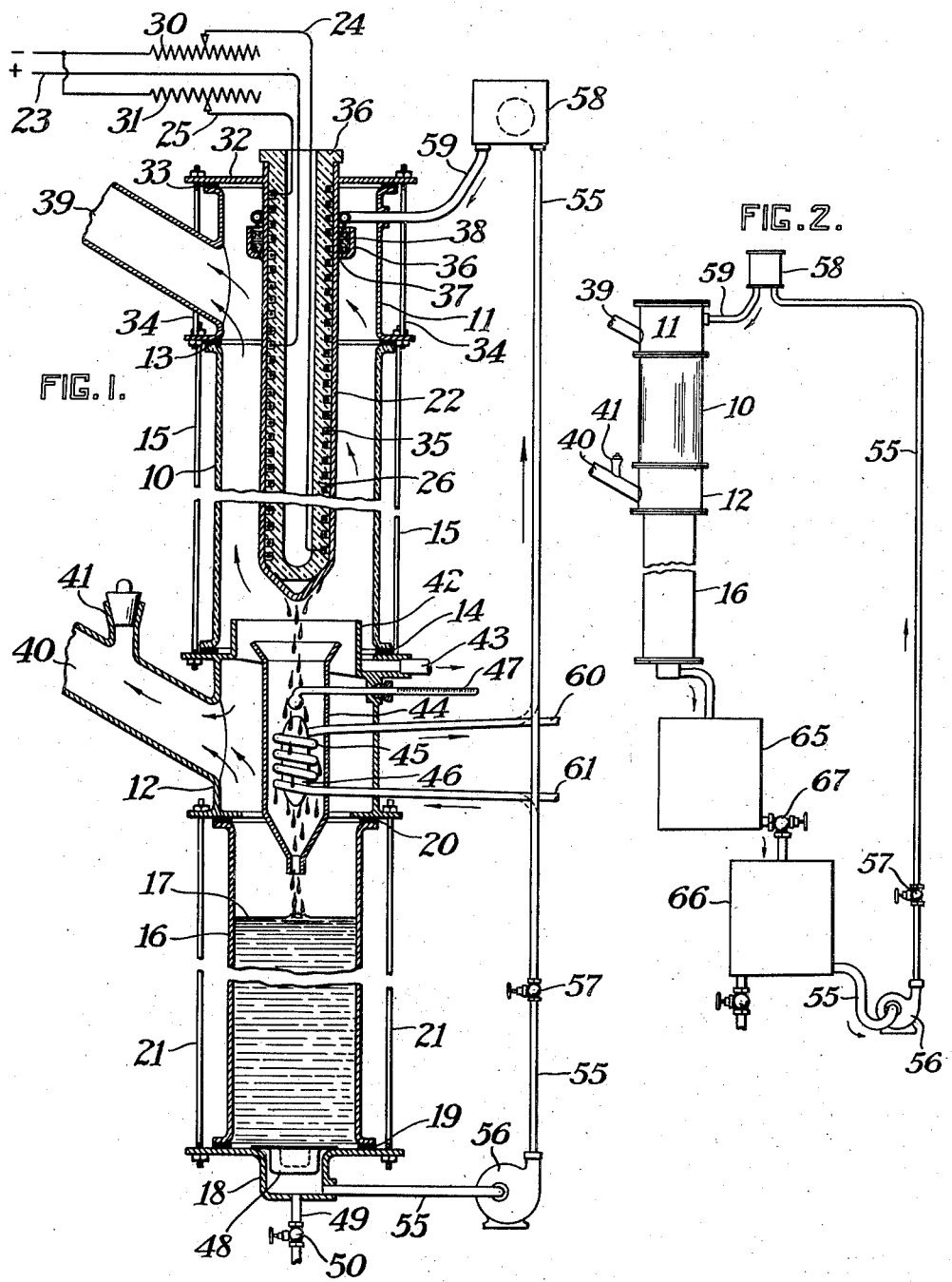
Fig. 1 illustrates a vertical section of a single unit still embodying the principles of my invention.
Fig. 2 is a diagrammatic elevation of a modification of apparatus illustrated in Fig. 1.

Referring to Fig. 1 reference numeral 10 designates the air cooled condensing portion of a still casing which may be of metal, but is preferably of glass in order to facilitate observance and control of the distillation. Element 10 is attached at its upper and lower ends to manifold boxes 11 and 12, gaskets 13 and 14 and draw bolts 15 providing gas tight seals at the joints. Numeral 16 designates a reservoir for liquid 17 to be distilled and is attached at its upper end to manifold box 12 and at its lower end to base plate 18 and by means of gaskets 19 and 20 and draw bolts 21. Reference numeral 22 designates a heating or evaporating element, heated by electricity through electrical connections 23, 24 and 25 and resistance units 30 and 31. This unit is rigidly welded to a plate 32 which is secured to the manifold box 11 by resilient gasket 33 and bolts 34. The element is heated by a resistance coil 35 connected to electrical conductors 23, 24 and 25, which is mounted in a spiral shaped recess in a porcelain core 26. An annular distributing head 36 is mounted upon the upper portion of element 22 in such a manner that an annular space 37 is provided to enable flow of liquid, 38 contained in the head, down the outside walls of 22.

Manifolds 11 and 12 are provided with conduits 39 and 40 respectively which are connected to high vacuum pumps (not shown) which serve to evacuate the space in the still. Conduit 40 is provided with a stoppered opening 41 through which material to be distilled is introduced into the still. The top of manifold box 12 is provided with an annular ring 42 somewhat smaller in diameter than 10 so that the walls of the two form a circular gutter which collects distillate, flowing by gravity down the walls of 10, and delivers it to a withdrawal conduit 43. Manifold box 12 supports a centrally located cylindrical element 44 having a flared upper portion and a constricted lower portion in which is mounted a cooling coil 45, a liquid deflecting core 46 and a thermometer 47.

Base plate 18 is provided with a filter 48 and a withdrawal conduit 49 provided with valve 50. Conduit 55 communicating with base plate 18 and provided with pump 56 and valve 57 serves to convey liquid to be distilled from reservoir 16 to a flow meter 58. Conduit 59 communicating with 58 conveys liquid from the flow meter into the distributing head 36. Conduits 60 and 61 connected to cooling coil 45 serve to convey cooling fluid into and out of the cooling element. In many cases it is desirable to preheat the liquid to be distilled and this can be conveniently accomplished by circulating liquid from conduit 55 into the cooling coil as shown by the dotted lines.

Fig. 2 illustrates a still substantially identical to that of Fig. 1 but provided with reservoirs 65 and 66 which make it possible to positively prevent mixing of distilland that has been through the still a lesser number of times, with that which has been through a greater number of times. This arrangement also enables the exact time of each cycle to be measured.

Referring to Figs. 3, 4 and 5 reference numeral 70 designates a vacuum tight chamber provided with a base 71 and a top section in the form of arches 72 and 73 which are provided with conduits 74 and 75, communicating with high vacuum pumps (not shown). Numeral 76 designates pipes traversing the length of the still and having a series of small holes 77 along the lowest portion thereof. Pipes 76 communicate with a common header 78, through which liquid to be distilled is delivered to heating and vaporizing elements 79 through holes 77. Vaporizing elements 79 run longitudinally of the still, directly under perforated delivery pipes 76 and in spaced relation thereto and are heated by steam or equivalent heating fluid delivered through header 80 and withdrawn through header 81. Partitions 82 and 83 integral with walls 70 of the still chamber are separated by gas tight spacers 84 which form a series of longitudinal openings 85 through which a cooling fluid such as water is circulated by introduction through header 86 and withdrawal through header 86a. The top of partition 82 is provided with a series of longitudinal projections 87 between which are perforations 88. The pairs of projections 87 form gutters which collect undistilled material falling from heating or vaporizing elements 79, which material flows through holes 88, down the cool walls of spacers 84, onto slanted base 71 and thence through conduit 90 into reservoir 91. The top of partition 82 is at an angle as shown in Fig. 5 and serves to collect distillate condensed thereon as well as that dripping from the walls and condenser plates 94 and deliver it to pipes 92 communicating with header 93.

Conduit 95 connected to the bottom of reservoir 91 is provided with a pump 96 and valve 97 and serves to deliver distilland from reservoir 91 to header 78. Reservoir 91 is provided with a valve 98 through which liquid to be distilled is introduced or undistilled residue is removed. A filter 99 is provided at the base of 91 to remove solids from re-cycled liquid and thus prevent clogging of perforations 77 in conduits 76. Condenser plates 94 remain at a sufficiently low temperature to efficiently condense most distillates since transfer of heat by convection in a high vacuum is slight. Where the character of the distillate requires these plates can be internally channeled and a cooling fluid circulated therein.

Figure 6:
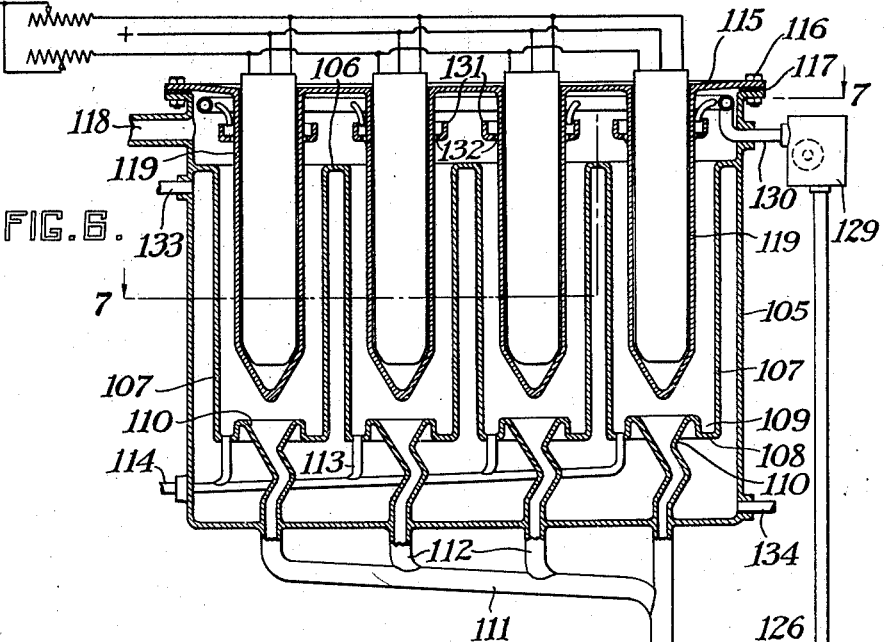
Fig. 6 is a vertical section of a still employing a plurality of distilling units similar to that illustrated in Fig. 1.
Figure 7:
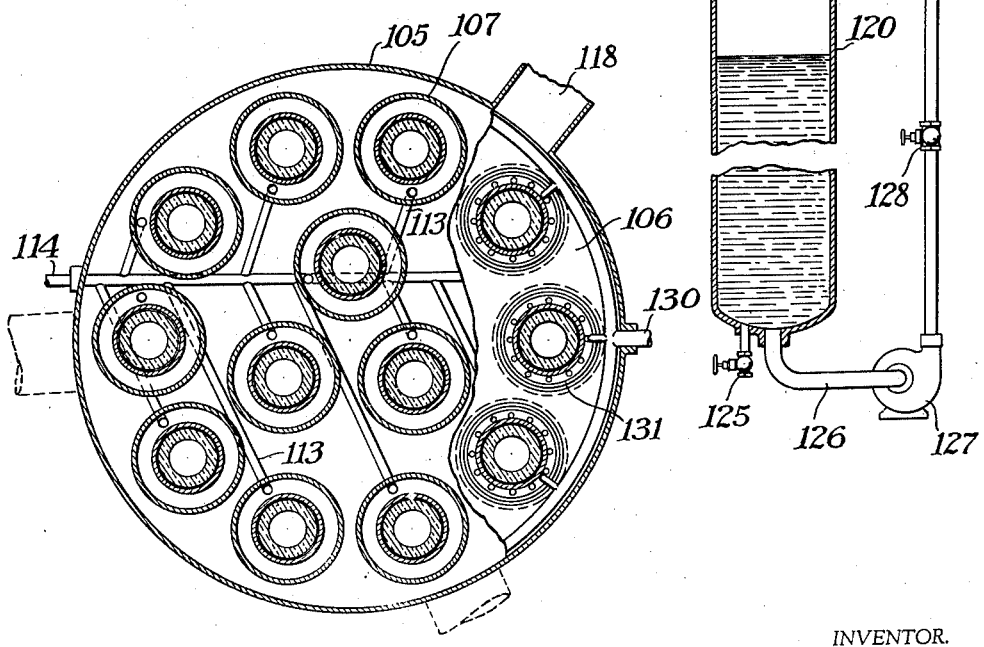
Fig. 7 is a section taken on line 7—7 of Fig. 6.

Referring to Figs. 6 and 7 numeral 105 designates a cylindrical still casing integral with partition 106 which supports a plurality of cylindrical condensing elements 107. Condensing elements 107 are closed at the lower ends thereof by integral alembic shaped bases 108 having annular recessed portions 109 which form gutters serving to collect distillate flowing down the walls of condensing elements 107 and also having a funnel shaped portion 110 into which undistilled liquid drops and is conveyed to a common conduit 111 by pipes 112. Distillate collecting in gutters 109 flows by gravity into conduits 113 and thence into a common collecting conduit 114. Numeral 115 designates a still cover plate rigidly fixed in gas tight relation to casing 105 by bolts 116 and gasket 117. The cover plate is integral with and supports a plurality of cylindrical vaporizing elements 119 which are shown as being electrically heated as described in connection with Fig. 1. Numeral 118 designates conduits integral with the upper wall of casing 105 which are connected to high vacuum pumps (not shown) which serve to evacuate the still.

Numeral 120 designates a reservoir provided with a withdrawal and introduction valve 125 and communicates at its base with conduit 126, provided with pump 127 and valve 128, which serves to deliver distilland to a flow indicating device 129. Liquid from 129 flows through conduit 130 which delivers it to the distributing heads 131 of each vaporizing column. Reference numeral 132 designates holes in the heads 131 through which the liquid flows onto the heated vaporizing surface of elements 119. A fluid which serves to cool the walls of the condensing element and the undistilled residue falling in elements 110 and conduits 112 is introduced through conduit 133 and withdrawn through conduit 134.

In operation employing the apparatus of Fig. 1, liquid to be distilled for instance cod-liver oil is introduced through 41 into reservoir 16. Opening 41 is then closed and high vacuum pumps such as condensation pumps connected to conduits 39 and 40 put into operation. As the pressure in the still is lowered large volumes of gas and volatile materials absorbed in the oil are given off. Degassing is aided by starting pump 56 which withdraws liquid from the reservoir and forces it into distributing head 36, from which it flows in a thin film down the walls of vaporizing element 22, and falls on to cooling element 45. After degassing has been completed and the pressure lowered to an appropriate value for molecular distillation such as about .001 mm., the heating element 22 is heated to an elevated temperature while circulation of the oil is continued. In order to quickly raise the oil to distilling temperature the first portion of element 22 may be heated to a higher temperature than the lower portion by decreasing the resistance of unit 31.

With cod-liver oil a first fraction is removed at about 118° C. which contains vitamin A alcohol. Molecules evaporating from surface 22 are condensed on walls 10 and flow by gravity into gutter 42 from which they are removed through conduit 43. Undistilled liquid falls from the pointed lowest portion of element 22 on to the cooling element 45, the core 46 of which provides intimate contact between the heated liquid and the cooling element. The liquid in a cooled state, or at any desired temperature determined by the rate of flow and temperature of cooling fluid in conduits 60 and 61, then falls into reservoir 16 and is again re-circulated. Higher boiling fractions are removed at successively elevated temperatures in the same manner, vitamin D being obtained at about 140°–165° and vitamin A esters at about 180°–220° C.

In order to substantially prevent mixing of distilled liquid, with undistilled liquid, or with liquid which has been circulated a lesser number of times, reservoir 16 is preferably of considerable length and rather narrow. As a result there is a tendency for liquid falling from the cooling element to stratify and mixing with undistilled liquid is minimized. This result is made more positive by using the apparatus illustrated in Fig. 2. When using this apparatus, material to be distilled is introduced into reservoir 66. Valve 67 is closed and the liquid from reservoir 66 circulated through the still in the manner described in connection with Fig. 1. Undistilled liquid is collected in reservoir 65. After reservoir 66 has reached a desired low value valve 67 is opened and the contents of 65 allowed to flow into 66. The valve is again closed and the re-circulation continued. The use of the system of reservoirs prevents any possibility of mixing and also enables the exact time of an individual cycle to be measured by the time taken to empty the reservoir. Since the rate of distillation under molecular conditions is proportional to the mol. fraction of the material to be removed from the distilland it is desirable to prevent mixing of distilled material poor in the substance to be separated, with richer undistilled material, or material which has been through the still a lesser number of times.

The operation of the apparatus illustrated in Figs. 6 and 7 is practically the same as that of Fig. 1 except that liquid to be distilled is circulated over a plurality of heated vaporizing elements. Instead of air cooling the condenser walls cooling is effected by circulating cooling fluid such as water through conduits 133 and 134. Since this cooling fluid is also in contact with conduits 112 and flared members 110, undistilled liquid is cooled as it falls from the vaporizing elements and is conveyed to the reservoir.

In operation employing the apparatus of Figs. 3, 4 and 5, liquid to be distilled is introduced into reservoir 91 through valve 98. Vacuum pumps connected to 74 and 75 are started and liquid drawn from 91 by pump 96 and forced into conduits 76. The liquid flows through the small perforations 77 in the bottom of conduits 76 and falls on heating elements 79 which may be warmed to improve the rate of degassing. The liquid falls from elements 79 into gutters 88 and flows through perforations 88, down the cooled walls 84 on to slanted plate 71 which collects and returns it to reservoir 91 by way of conduit 90. After degassing has been completed elements 79 are heated to the distilling temperature of the first fraction and re-cycling continued until it has been removed. Distillate condensing on plates 94 and walls 70 drops onto slanted plate 82 which also acts as a condenser and is delivered to header 93 and withdrawn from the still. Higher boiling fractions are removed in the same manner.

The apparatus illustrated in the various drawings can be constructed of metal or glass or any suitable material. It is apparent that all seals must be substantially gas tight so that a high vacuum can be maintained. The vertical vaporizing elements should preferably be corrugated to aid in distributing distilland thereon in a thin film and prevent its gathering in local streams.

It will be apparent that many changes can be made in the above described structures or in their specific mode of operation without departing from the spirit or scope of my invention. For instance while I have disclosed the apparatus as being equipped with cooling elements it is apparent that in distilling relatively stable compounds such cooling would be unnecessary. In distilling materials of low stability, such as vitamin containing oils, it is important that the contents of the reservoir be below that at which decomposition takes place. The use of cooling elements in such a case is therefore advisable. Instead of using internal vaporizing elements it may be desirable to flow the distilland down a heated external surface and condense distillate upon a smaller centrally located cooled surface. By thus reversing the positions of the vaporizing and condensing surfaces, the condensate is collected upon a smaller area and its rate of drainage thus increased. The number, shape and size of the vaporizing elements can obviously be varied considerably, to conform with the requirements of any particular distillation treatment. By varying the size and length of these elements and the rate of flow of distilland any desired heating period can be obtained. Preferred dimensions are those which enable a short heating period. Thus short columns or heating conduits of relatively small diameter and rapid cooling of undistilled residue lessen the possibility of thermal decomposition.

The essential operating conditions for molecular distillation process are well known and have been described by Burch U. S. Patent 1,955,321; Hickman U. S. Patents 1,942,858, and 1,925,559; Carr British Patent 415,088; "Washburn Bur. St. Jour. Res." 2 478–83 (1929); Carr et al. Nature 131 92 (Jan. 21, 1933) and Bronsted et al. "Philosophical Magazine" 43 31–49 (1922). Pressures below .1 mm. and preferably below .01 mm. such as between .001 and .0001 mm. are usually employed. Distances separating the evaporating and condensing surfaces may be up to twice the mean free path of residual gas. However distances of less than the mean free path give considerably faster distillation rates and are therefore generally used. As the path increases with decrease in pressure there is no limit to the distance which may be employed as long as the pressure used is sufficiently low for the particular distance selected. Usually distances of up to 10 inches such as between ½ and 6 inches have been found to be most satisfactory. Temperatures of between room temperature and 350° C. may be employed. Those temperatures between 50° and 300° C. and especially between 70° and 250° C. are most satisfactory for distilling animal and vegetable oils to obtain vitamin concentrates or pure glycerides.

While I prefer to operate under molecular distillation conditions I have found that distillation under high vacuum is possible where distances of many times the mean free path are used. When operating in this manner it is essential that vaporized molecules have an unrestricted path of travel to the condensing surface. Although such distillation conditions are not actually molecular they are to be understood as being within the scope of my invention.

While I have found it convenient to describe my invention by reference to the distillation of particular materials it is broadly applicable to the distillation of all substances amenable to high vacuum distillation, such as hydrocarbons, drying oils, animal and vegetable glycerides, fats and waxes, etc. My invention is of special value in the molecular distillation of vegetable and animal oils such as cottonseed, tuna-liver, wheat germ, menhaden, halibut-liver, salmon and other fish oils, linseed etc., oils, to obtain fat soluble vitamin concentrates or purified highly unsaturated glycerides.

By operating in accordance with my invention it is possible to regulate and change the distillation to an extent heretofore unattainable. Due to the facility with which distillation conditions can be regulated my invention enables avoidance of overheating or underheating and attendant loss in distillation rate or decomposition. In distilling fish oils it has been found that by using apparatus of the type described, that a much higher yield of vitamin concentrates is obtained than when employing the well known multi-column still in which distilland is passed over a number of successive columns. Furthermore by using this apparatus I have isolated a new antirachitic substance distilling in major amounts at about 194° C. which could not be detected in distillates from the conventional still, apparently because of complete destruction. It is therefore seen that due to the possibility of careful regulation and short heating period that thermal decomposition is avoided to a considerable extent.

Although degassed distilland may be used my invention has the decided advantage that untreated oil may be introduced into the still and the degassing and distillation carried out therein in one treatment. An outstanding advantage of my invention is that fractionation under molecular conditions can be performed without using a series of stills thus greatly decreasing the pieces of apparatus required and eliminating expense and difficulties associated with their operation.

It is to be understood the term "high vacuum" as used in the specification and claims is to be accorded its common meaning in the vacuum art, namely, a pressure of the order of .1 mm. or less.

What I claim is:

1. Distillation apparatus comprising in a closed system a vaporizing surface, a condensing surface disposed opposite thereto in such a manner that free unrestricted space is available for travel of vaporized molecules from the evaporating to the condensing surface, means for maintaining a high vacuum in the space between said surfaces, means for continuously conveying distilland onto the vaporizing surface and means located within the still for quickly cooling undistilled liquid, to below decomposition temperature as it is removed from the vaporizing surface.

2. Distillation apparatus comprising in a closed system a vaporizing surface, a condensing surface disposed in such relation thereto that unrestricted space is available for travel of vaporized molecules from the vaporizing to the condensing surface, means for maintaining a high vacuum in the space between the surfaces, a reservoir for material to be distilled, means for withdrawing material from the reservoir and introducing it onto the evaporating surface and means for immediately cooling undistilled material to below decomposition temperature and returning it to the reservoir.

3. Distillation apparatus comprising in a closed system a vaporizing surface, a condensing surface disposed in such relation thereto that unrestricted space is available for travel of vaporized molecules from the vaporizing to the condensing surface, a reservoir for material to be distilled, means for maintaining a high vacuum over the reservoir and in the space between the evaporating and condensing surfaces, means for continuously withdrawing distilland from the reservoir and circulating it over the evaporating surface and means for quickly and immediately cooling undistilled residue to below decomposition temperature, and returning it to the reservoir, the volume of the reservoir being many times that of the material which would be introduced onto the evaporating surface.

4. Distillation apparatus comprising in a closed system, a vaporizing surface, a condensing surface disposed in such relation thereto that unconstricted space is available for travel of vaporized molecules from the vaporizing to the condensing surface, means for maintaining a high vacuum in the space between the two surfaces, two reservoirs connected together by a valved conduit, means for continuously withdrawing liquid to be distilled from one of the reservoirs and introducing it in a degassed condition as a thin film onto the vaporizing surface, means for quickly cooling undistilled residue as it flows from the vaporizing surface to below decomposition temperature and means for introducing the cooled residue into the other reservoir.

5. The process of high vacuum, distillation which comprises establishing a body of liquid, organic, distillable material, circulating portions thereof in a substantially degassed condition and in a thin film over the vaporizing surface of a high vacuum short-path still, immediately cooling undistilled residue as it flows from the distilling surface to below temperatures of decomposition or distillation in order to prevent decomposition, returning it in a degassed condition to said body and recirculating it in portions over the vaporizing surface, the volume of said body being many times that of the liquid on the vaporizing surface.

6. The process of high vacuum molecular distillation which comprises establishing a body of liquid, organic, distillable material, circulating portions thereof in a substantially degassed condition and in a thin film over the vaporizing surface of a molecular still, immediately cooling undistilled residue as it flows from the distilling surface to below temperatures of decomposition or distillation in order to prevent decomposition, returning it in a degassed condition to said body and recirculating it in portions over the vaporizing surface, the volume of the said body being many times that of the liquid on the vaporizing surface.

7. In a process of molecular distillation of liquid, organic materials containing heat labile compounds the steps which comprise, establishing a reservoir of the material to be distilled, continuously withdrawing material therefrom and circulating it in a thin film over the vaporizing element of a molecular still, immediately cooling undistilled residue to below decomposition and distillation temperature as it flows from the evaporative surface in order to prevent decomposition and returning it in a degassed condition to the reservoir, continuing the recycling until a desired fraction has been removed and then continuing the operation at successively elevated temperatures to remove other fractions in the same manner, the liquid in the reservoir being many times the volume of the liquid on the vaporizing element.

8. In a process of molecular distillation of vegetable or animal oils to obtain fat soluble vitamin concentrates, the steps which comprise, establishing a reservoir of oil to be distilled, continuously withdrawing oil therefrom and circulating it in a thin film over the vaporizing element of a molecular still, immediately cooling undistilled oil as it flows from said element to below decomposition and distillation temperature in order to prevent decomposition and returning it in a degassed condition to the reservoir, continuing the recycling until the desired fraction has been removed, elevating the temperature of the evaporating element to remove a higher boiling fraction and continuing the recirculation in substantially the same manner as with the first fraction, the liquid in the reservoir having many times the volume of the liquid on the vaporizing element.

KENNETH C. D. HICKMAN.